Oct. 22, 1935.   R. J. BRITTAIN, JR., ET AL   2,018,008
JOURNAL BOX
Filed July 12, 1932   2 Sheets-Sheet 2

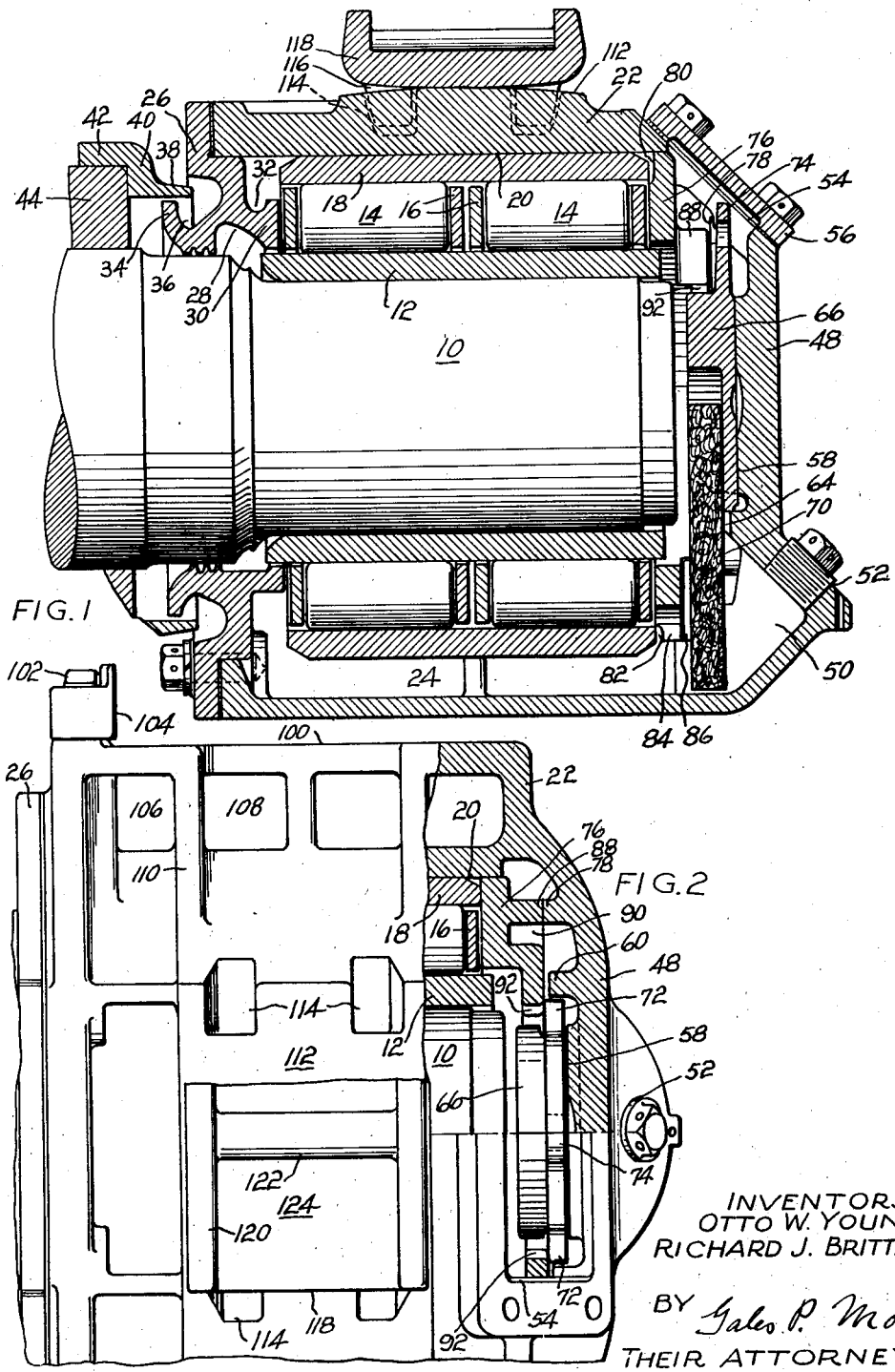

INVENTORS:
OTTO W YOUNG,
RICHARD J. BRITTAIN JR.,

BY Gales P. Moore
THEIR ATTORNEY.

Patented Oct. 22, 1935

2,018,008

UNITED STATES PATENT OFFICE 2,018,008

JOURNAL BOX

Richard J. Brittain, Jr., Bloomfield, and Otto W. Young, East Orange, N. J., assignors to General Motors Corporation, Detroit, Mich., a corporation of Delaware Application July 12, 1932, Serial No. 622,100

9 Claims. (Cl. 308—41)

This invention relates to journal boxes and comprises all of the features of novelty herein disclosed. An object of the invention is to provide an improved journal box. Another object is to provide a journal box thrust construction of great simplicity, economy and ease of assembly. To these ends and also to improve generally upon devices of this character, the invention consists in the various matters hereinafter described and claimed. In its broader aspects, the invention is not necessarily limited to the specific construction selected for illustrative purposes in the accompanying drawings in which Fig. 1 is a vertical sectional view.

Fig. 2 is a plan view with a portion of the box, its bearings, and a retaining ring in horizontal section, the cover being removed.

Figure 3:
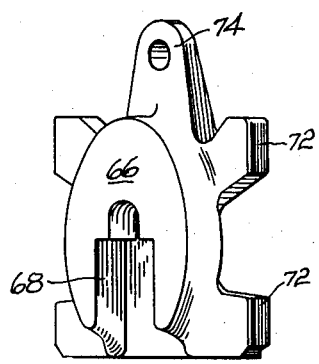
Fig. 3 is a perspective view of the thrust block, enlarged.
Figure 4:
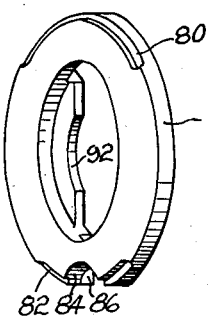
Figs. 4 and 5 are perspective views of the retaining ring.
Figure 5:
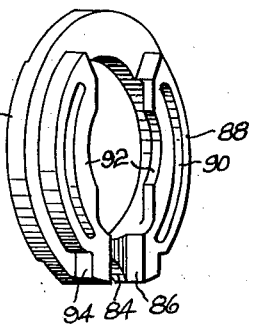
Figure 6:
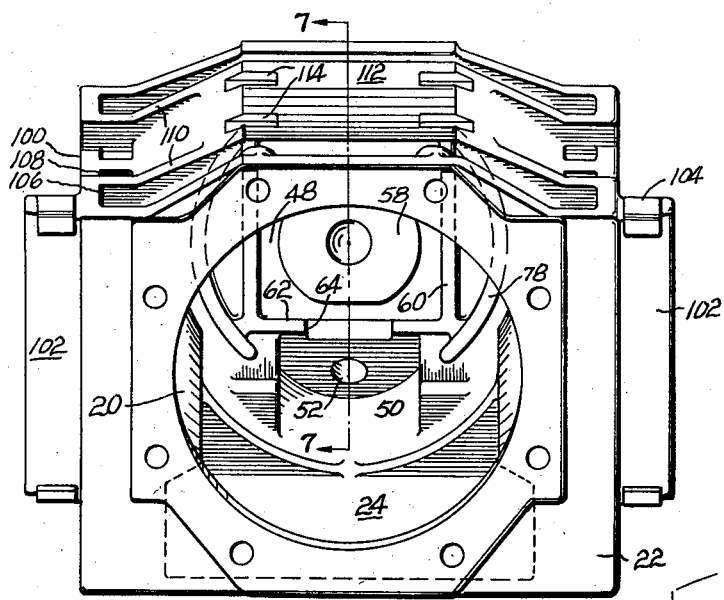
Fig. 6 is an end view of the box with one end tipped upwardly.
Figure 7:
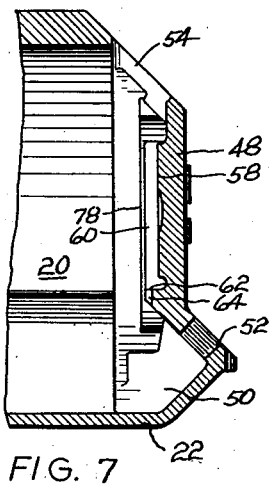
Fig. 7 is a sectional view of a portion of the box on the line 7—7 of Fig. 6.

The numeral 10 indicates a shaft or axle carrying a raceway sleeve 12 for roller bearings 14 having end rings 16. The rollers run in an outer raceway sleeve 18 which is pressed in the bore 20 of a journal box 22. The bore 20 is straight and uninterrupted for more than 180° but is interrupted at the bottom to form a lubricant reservoir 24 above which the sleeve is unsupported for an angular distance less than 180°.

The rear end of the box where the axle enters is closed by a flanged cap or sealing ring 26 bolted on against a gasket. The ring has an internal groove 28 to collect and drain oil thrown from the axle and is provided with an extension 30 which terminates in a flat face to guide the adjacent end ring 16. Around the upper portion of the extension 30 is a relief groove 32 receiving surplus oil from the rollers and draining the oil to the receptacle 24. The cap or sealing ring has grease grooves at the axle and carries an outwardly extending flange 34 which forms a drain groove 36. A guard flange 38 projects axially across the flange 34 from a guard ring 40 which has a second axial flange 42 pressed on a hub 44 of a wheel. The guard flange and the drain groove cooperate to keep foreign matter from entering the box.

The front end of the box has an end wall 48 provided with an enlargement 50 having a filling opening 52 through which lubricant may be supplied to the reservoir 24. The box is slabbed off on an incline to provide an opening 54 closed by a cap 56 fastened on with screw bolts. On the wall 48 is an annular face or pad 58 and at the sides of this are parallel vertical ribs 60 terminating at a horizontal shelf 62 which is centrally notched at 64. A thrust block 66 having a slot 68 for a wick 70 is insertable through the opening 54 to rest on the shelf 62 and has a plurality of lugs or extensions 72 which fit between the ribs 60 to hold the block from rotation. To facilitate handling, the block is provided at the top with an eyed extension 74 forming a finger piece.

The thrust block is held against or close to the face or pad 58 by a retaining ring 76 which is interposed between the end of the sleeve 18 and a pair of arcuate abutment ribs 78 on the end wall 48. The ring 76 is notched at 80 and 82 next to the upper and lower portions of the sleeve 18, the purpose being to prevent contact of the pressed-in sleeve with the ring at those portions of the ring which are not backed up with abutment faces on the box. The ring is also notched more deeply at 84 to provide a passage for oil between the wick chamber and the lower rollers of the bearing. The ring also has a vertical slot 86 to fit and hold the sides of the wick 70. Arcuate faces or ribs 88 on the ring are arranged to abut against the box ribs 78 this to prevent distortion of the ring when the raceway sleeve 18 is forced into the box bore against the unrelieved portions of the ring. The ribs 88 are recessed at 90 and carry internal projections or flanges 92 which straddle a portion of the thrust block 66 and clear the vertical ribs 60. These internal projections extend inwardly towards the center of the ring far enough so that they overlap the outwardly extending lugs 72 on the thrust block to hold the latter in place and especially from movement towards the shaft. The retaining ring is inserted in the box from the open end thereof and has flat faces 94 which enter between the flat sides of the enlargement 50 whereby the ring is held from turning. The thrust block is passed downwardly through the box opening 54 and between the spaced upper ends of the ribs 88 and flanges 92, the lugs 72 passing downwardly outside of the flanges 92 and being guided by the vertical ribs 60. The thrust block has its thrust portion in the plane of the ring 76 while only the portion carrying the outwardly extending lugs or projections 72 is beyond the plane of the ring to overlap the internal projections or flanges 92. Thus the thrust block is held in close association with the end wall of the box ready for quick removal and the end wall is close to the sleeve 18 and to the shaft 10.

Figure 9:
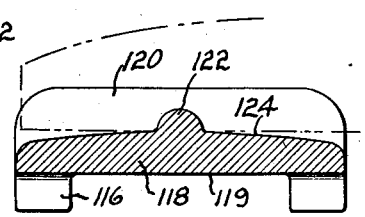
Fig. 9 is a central cross sectional view of the seat plate.
Figure 8:
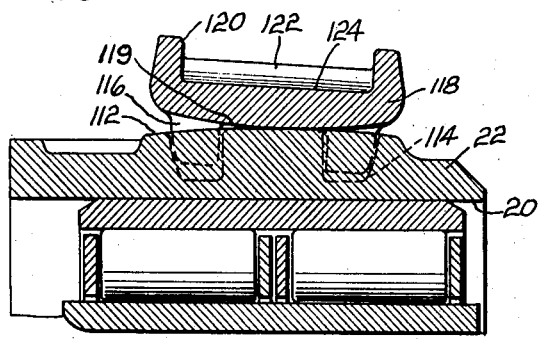
Fig. 8 is a vertical sectional view of a portion of the box and the seat plate.

The box 22 has flat side walls 100 each having a single vertical pedestal flange 102 covered by a wear plate 104. In the present instance, the box is quite thick between the side walls 100 and the bore 20 to adapt the box for wide jaw pedestals. The box has cored recesses 106 and 108 and bracing webs 110 to reduce the weight and give strength. Its top face is elevated somewhat and is preferably crowned at 112 longitudinally of the axle, the crown preferably being cylindrical. Recesses 114 in the box are to receive lugs or projections 116 on a seat plate 118 which rocks on the surface 112, the under face 119 of the seat plate preferably having a cylindrical crown also. The recesses 114 and the lugs 116 are arranged in pairs and are spaced apart both longitudinally and laterally of the box. Consequently the engaging faces are continuous and uninterrupted for the full length of the seat plate across the central portion of the box where the seat plate bears in its central or more usual position and so tends to produce the most wear. In other words, the full length of the seat plate has a bearing on the box at the middle portion of the crown. The lugs and recesses are curved to facilitate tilting of the seat plate but they restrict bodily shifting of the seat plate crosswise or longitudinally. The seat plate has side flanges 120 and a connecting rib 122 while the upper face 124 of the plate is crowned crosswise of the box for cooperation with a car frame member such as the usual equalizer bar indicated in broken lines in Fig. 9, the crown being exaggerated.

We claim:

1. In a device of the character described, a journal box having an end wall, a shaft journalled in the box, a thrust block interposed between the shaft and the end wall, a ring in the box and having a portion abutting against the end wall, a bearing sleeve in the box and holding said ring against the abutment, the ring having an internal flange projecting inwardly towards the center of the ring and located in a plane beyond the end of the shaft, and the thrust block having a portion projecting outwardly and overlapping the internal flange and lying between the latter and the end wall of the box whereby the thrust block is held from movement towards the shaft by the internal flange; substantially as described.

2. In a device of the character described, a journal box having an end wall, a shaft journalled in the box, a thrust block interposed between the shaft and the end wall, a ring in the box and having internal projections extending inwardly towards the center of the ring and straddling a portion of the thrust block, and the thrust block having extensions projecting outwardly and overlapping said internal projections and interposed between the latter and the end wall; substantially as described.

3. In a device of the character described, a journal box having an end wall, a shaft journalled in the box, a thrust block interposed between the shaft and the end wall, a ring in the box and having internal projections straddling a portion of the thrust block, the thrust block having extensions overlapping the projections and interposed between the latter and the end wall, and the box having an opening in the plane of the thrust block for removal of the thrust block between the internal projections; substantially as described.

4. In a device of the character described, a journal box having an end wall, a shaft journalled in the box, a thrust block interposed between the shaft and the end wall, a ring in the box and having internal projections straddling a portion of the thrust block, the thrust block having extensions overlapping the projections, the end wall having ribs embracing the extensions, and the end wall having an opening for removal of the thrust block between the projections and between the ribs; substantially as described.

5. In a device of the character described, a journal box having an end wall, a shaft journalled in the box, a thrust block interposed between the shaft and the end wall, the end wall having arcuate ribs with spaced-apart ribs between the arcuate ones for embracing extensions of the thrust block, a ring in the box and having abutment faces engaging the arcuate ribs, and the ring having internal projections clearing the spaced apart ribs and overlapping the extensions of the thrust block; substantially as described.

6. In a device of the character described, a journal box having an end wall, a shaft journalled in the box, a thrust block interposed between the shaft and the end wall, the end wall having abutment ribs, a ring in the box and having ribs abutting against the ribs on the box, and a bearing sleeve pressed into the box and engaging the ring only at those portions which are opposed to the abutment ribs; substantially as described.

7. In a device of the character described, a journal box having an end wall, a shaft journalled in the box, a ring in the box, a thrust block interposed between the end of the shaft and the end wall, the thrust block having its thrust portion in the plane of the ring with another portion beyond the plane of the ring, said other portion extending outwardly to overlap the ring and lying between the latter and the end wall whereby the overlapping parts hold the thrust block in close association with the end wall; substantially as described.

8. In a device of the character described, a journal box having an end wall, a shaft journalled in the box, a ring in the box and having a portion abutting against the end wall, a bearing sleeve in the box and holding said ring against the end wall, a thrust block interposed between the end of the shaft and the end wall, the thrust block having its thrust portion in the plane of the ring with another portion overlapping the ring and lying between the latter and the end wall; substantially as described.

9. In a device of the character described, a journal box having an end wall at the front, a thrust block in the box and unconnected with the end wall but engageable with it, a ring in the box, a shaft journalled in the box and terminating inside of the ring, the box having a bore open to the rear end to receive the ring, the ring surrounding a portion of the thrust block and having means extending inwardly towards the center of the ring and overlapping a portion of the thrust block to hold the latter in position next to the end wall; substantially as described.

RICHARD J. BRITTAIN, Jr.
OTTO W. YOUNG.